United States Patent [19]

Mortensen

[11] 4,020,935

[45] May 3, 1977

[54] DIRECT CRANKING STARTER DRIVE

[75] Inventor: Harold Richard Mortensen, Horseheads, N.Y.

[73] Assignee: Facet Enterprises, Inc., Tulsa, Okla.

[22] Filed: July 1, 1975

[21] Appl. No.: 592,137

[52] U.S. Cl. ........................ 192/104 R; 123/185 R; 74/6

[51] Int. Cl.$^2$ ................... F02N 15/00; F16D 43/04

[58] Field of Search .... 123/185 R, 185 CA, 185 G; 74/6; 192/104 R

[56] References Cited

UNITED STATES PATENTS

| | | | |
|---|---|---|---|
| 2,258,455 | 10/1941 | Jones | 74/6 |
| 2,353,904 | 7/1944 | Jones | 74/6 |
| 3,171,283 | 3/1965 | Giometti | 74/6 |
| 3,181,375 | 5/1965 | Sabatini | 74/6 |
| 3,263,509 | 8/1966 | Digby | 74/6 |
| 3,428,034 | 2/1969 | MacAfee et al. | 74/6 |
| 3,664,201 | 5/1972 | Vogel et al. | 74/6 |
| 3,744,468 | 7/1973 | Braum | 123/125 G |

*Primary Examiner*—Wendell E. Burns
*Assistant Examiner*—David D. Reynolds
*Attorney, Agent, or Firm*—Remy J. VanOphem

[57] ABSTRACT

A direct cranking starter drive for an internal combustion engine has a driven member drivably connected to the engine crank shaft and a driving unit drivably connected to the starting motor. A clutch between the driving unit and the driven member is engaged when the engine runs below a running speed for drivably connecting the driving unit to the driven member and is disengaged when the engine runs above the running speed for disconnecting the driving unit from the driven member. Bearings are provided for permitting relative rotation of the driving unit and driven member when the engine is running and the clutch is disengaged.

14 Claims, 1 Drawing Figure

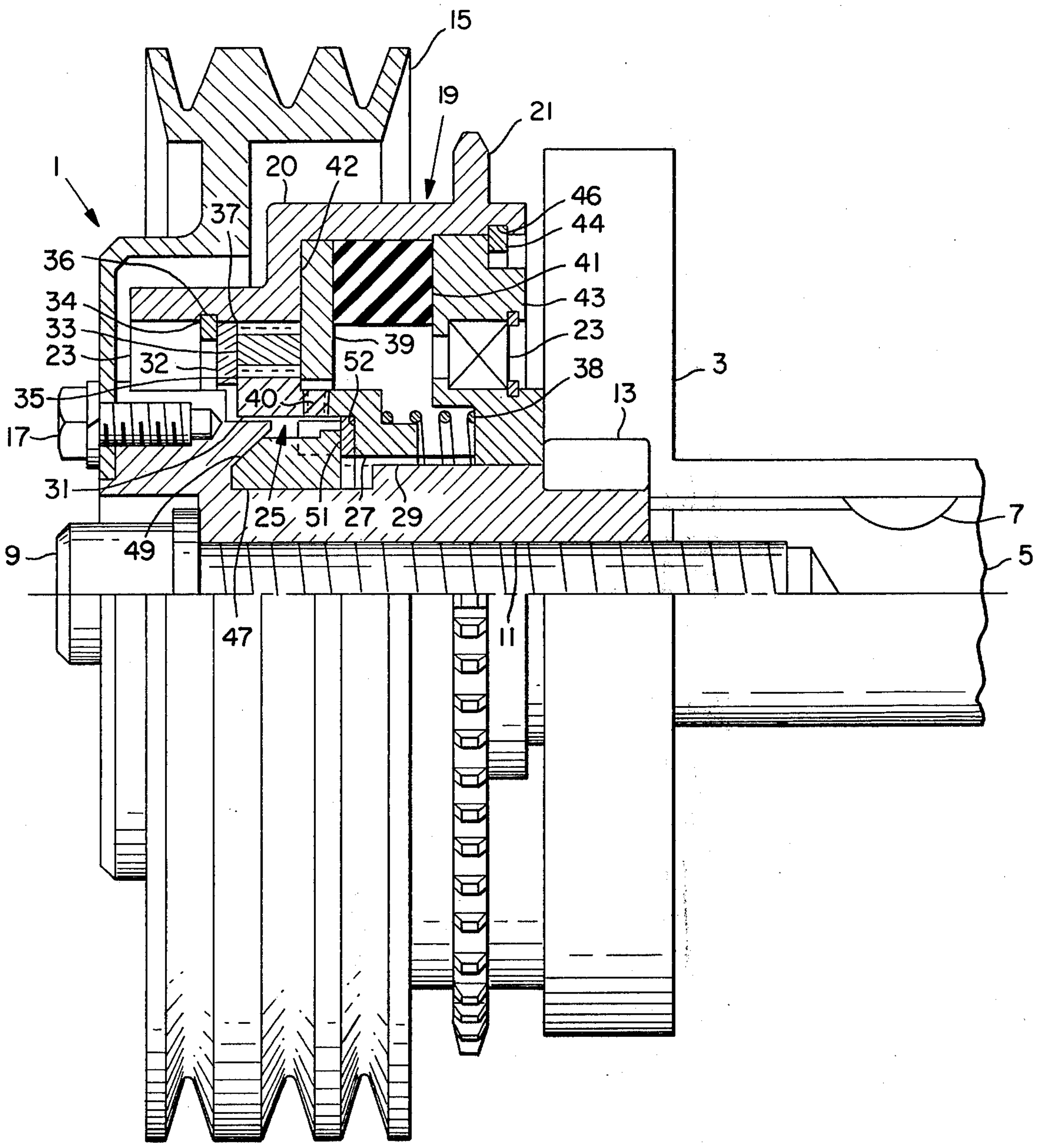
15
19
21
1
20
42
46
44
37
36
41
34
43
33
23
32
52
39
23
3
35
40
38
13
17
31
49
25
51
27
29
7
9
5
47
11

DIRECT CRANKING STARTER DRIVE

The invention relates to starter drives for use on internal combustion engines.

BACKGROUND OF THE INVENTION

Starter drives as used heretofore have a pinion which engages the ring gear on the engine flywheel when the starting motor is energized. Starters of this kind are noisy because the pinion on the starting mechanism must first mesh with the ring gear before cranking the engine. Also, one or more teeth on the pinion or ring gear may break while the pinion is meshing with the ring gear and disable the starter drive.

SUMMARY OF THE INVENTION

The invention relates to a direct cranking starter drive connected to the engine crank shaft through the engine vibration damper on te front of the engine. The starter drive is driven by a gear reduced starting motor through a chain and sprocket or other suitable mechanism. The starter drive includes a clutch which is engaged to drivably connect the starting motor to the engine when the engine speed is below running speed and automatically disengages when the engine attains running speed. The starter drive also includes an overload cushion for absorbing starting torque to avoid shock loads when the starting motor is first energized. A starter drive constructed according to the invention is silent in that it eliminates the need to engage and disengage a pinion on the starter drive with the ring gear on the flywheel when starting the engine.

The invention contemplates a starter drive adapted for use with an internal combustion engine and having a starting motor drivably connected thereto, comprising a driven member drivably connected to the engine crank shaft, a driving unit drivably connected to the starting motor, a clutch between the driving unit and the driven member, and means for disengaging the clutch when the engine runs above a predetermined speed for disconnecting the driving unit from the driven member and for engaging the clutch when the engine runs below the predetermined speed or drivably connecting the driving unit to the driven member.

DRAWING

The single FIG. of the drawing is an axial section showing a direct cranking starter drive constructed according to the invention.

DETAILED DESCRIPTION OF THE INVENTION

Referring to the drawing, a direct cranking starter drive 1 constructed according to the invention is shown therein mounted on the vibration damper 3 of an internal combustion engine. The vibration damper 3 is keyed to the engine crank shaft 5 by a woodruff key 7. The starter drive is secured to engine crank shaft 5 by a screw 9 extending through a sleeve 11 on the starter drive and threaded axially into engine crank shaft 5. Roll pins 13 secured between sleeve 11 and vibration damper 3 lock the sleeve to the vibration damper 3 so that the sleeve 11 rotates with crank shaft 5 at all times. An engine accessory pulley 15 is secured to sleeve 11 by screws 17; only one of which is shown.

The starter drive has a driving unit 19 including a cylindrical member 20 provided with an integral chain sprocket 21 which may be connected by a roller chain (not shown) to a gear reduced starting motor (not shown) mounted on the engine block. Driving unit 19 is rotatably mounted on sleeve 11 by roller bearings 23. Driving unit 19 is drivably connected to and disconnected from sleeve 11 by a clutch 25 having a driven clutch element 27 connected to sleeve 11 by a left hand helical spline 29 and having a driving clutch element 31 connected to a ring 33 by a right hand helical spline 35. Ring 33 is connected to driving unit 19 by a left hand helical spline 37 in cylindrical member 20. An annular stop 32 and a retaining ring 34 seated in a slot 36 in cylindrical member 20 limit forward movement of ring 33 and driving clutch element 31. A compression spring 38 urges driven clutch element 27 into engagement with driving clutch element 31. Both driven clutch element 27 and driving clutch element 31 are provided with opposing one way saw tooth dentils 40. When the starter motor is energized helical spline 29 urges driving clutch element 31 and driven clutch element 27 into engagement with a rotary movement in a direction to engage sawtooth dentils 40.

Driving unit 19 also includes a thrust washer 39 and a ring shaped cushion 41 of rubber or other suitable material positioned within cylindrical member 20 between an internal shoulder 42 on the cylindrical member 20 and a ring 43 secured to the cylindrical member 20 by a lock washer 44 in an annular slot 46 in the cylindrical member 20. When power is applied to the starting motor, ring 33 is moved by helical splines 35 and 37 into engagement with thrust washer 39 and compresses ring shaped cushion 41 to absorb starting torque.

Four throwout weights 47 (only one of which is shown) separate driven clutch element 27 from driving clutch element 31 when the engine operates above running speed. As throwout weights 47 move outwardly the opposing cam surfaces 49 on sleeve 11 and on throwout weights 47 move the weights rearwardly into engagement with a thrust washer 51 which engages a shoulder 52 on driven clutch element 27 and moves the driven clutch element 27 in opposition to the force of compression spring 38 out of engagement with driving clutch element 31 to separate sawtooth dentils 40.

OPERATION

When the engine stops running the clutch is engaged and the starter drive is as shown in the drawing. When the starting motor is energized to start the engine torque is transmitted through the chain and sprocket drive and rotates driving unit 19 in a clockwise direction. Helical splines 35 and 37 move ring 33 rearwardly against thrust washer 39 compressing cushion 41 to absorb the starting torque an avoid shock loads to prevent damage to the starter drive and driving chain. Torque is also applied to driving clutch element 31 engaged with driven clutch element 27 to rotate sleeve 11 and the engine crank shaft 5 and crank the engine. When the engine fires and runs sleeve 11, driven clutch element 27 and throwout weights 47 rotate at engine crank shaft speed. At a predetermined speed throwout weights 47 move outwardly and rearwardly guided by cam surfaces 49 and move driven clutch element 27 rearwardly against the opposition of compression spring 38 to separate dentils 40 and disengage the clutch. This disconnects the starting motor and driving unit 19 from rotating sleeve 11 and engine crank shaft 5. Roller bearings 23 permit the crank shaft and sleeve 11 to rotate relative to driving unit 19. When the engine speed is reduced to a speed lower than the predetermined speed, spring 38 moves driven clutch element 27 toward driing clutch element 31 to engage sawtooth dentils 40 and moves throwout weights 47 forwardly and inwardly along opposing cam surfaces 49 to their original positions. The engaging speed preferably is selected below running speed so that clutch engagement occurs only when the engine stops.

A starter drive constructed according to the invention is silent in that it eliminates the need to engage and disengage a pinion on the starter drive with the ring gear on the engine flywheel when starting the engine. Sleeve 11 of the starter drive is always connected to the engine crank shaft and when the engine speed is below running speed the starting motor is drivably connected by the clutch to sleeve 11. The starter drive has a ring-shaped cushion 41 to absorb starting torque and to avoid shock loads when the starting motor is first energized. Also, the overall dimensions of the starter drive are fixed and do not vary while operating to facilitate assembly of the starter drive to the engine.

What is claimed is:

1. A starter drive adapted for use with an internal combustion engine and having a starting motor drivably connected thereto, comprising:

- a driven member drivably connected to the engine crank shaft;
- a driving unit drivably connected to the starting motor, said driving unit further comprising:
  - a cylindrical driving member coaxially disposed with said engine crank shaft; having a helical thread on a portion of the inside diameter;
  - a driving clutch element disposed within said cylindrical driving member internal diameter for rotation therewith, said driving clutch element having a helical spline on its external diameter and one-way dentyl sawtooth clutch teeth on one face portion; and
  - means for driving said driving clutch element interposed said cyclindrical driving member and said driving clutch element, said driving means including a ring member with a helical thread on the outside diameter, said helical thread adapted to communicate with the helical thread on the inside diameter of the cylindrical driving member, said ring member further having a helical thread on the inside diameter, said helical thread adapted to communicate with the helical thread on the outside diameter of the driving clutch element, whereby when a torque is applied to said cylindrical driving member the ring member is moved towards the driven member;
- a clutch between the driving unit and the driven member; and
- means for disengaging the clutch when the engine runs above a predetermined speed for disconnecting the driving unit from the driven member and for engaging the clutch when the engine runs below the predetermined speed for drivably connecting the driving unit to the driven member.

2. A starter drive as described in claim 1 which includes bearing means for providing relative rotation between the driving unit and the driven member when the clutch is disengaged and the engine is running.

3. A starter drive as described in claim 2 in which the driven member is always drivably connected to the engine crankshaft.

4. A starter drive as described in claim 3 including means for mounting the starter drive on the vibration damper at the front of the engine.

5. A starter drive as described in claim 1 in which the clutch includes a driving element connected to the driving unit and a driven element connected to the driven member and the means for disengaging the clutch includes throwout weights operatively connected to one of the elements for disengaging the driving and driven elements at the predetermined speed.

6. A starter drive as described in claim 5 in which movement of the throwout weights is guided by opposing cam surfaces on the driven member and throwout weights.

7. A starter drive as described in claim 6 in which the means for engaging the clutch is a spring which moves the driving and driven elements into driving engagement and moves the throwout weights along the cam surfaces to their original positions.

8. A starter drive as described in claim 5 in which the clutch elements are connected to the driving unit and driven member by helical splines which urge the elements into engagement when a torque is applied to the starter drive.

9. A starter drive as described in claim 8 in which the clutch elements include opposing one-way dentils which are urged into engagement when a torque is applied to the starter drive.

10. A starter drive as described in claim 1 which includes overload cushioning means for absorbing starting torque to avoid shock loads when the starting motor is first energized.

11. A starter drive as described in claim 10 in which the cushioning means includes resilent material, and a member is drivably connected between the driving unit and the clutch for compressing the resilent material when the starting motor is energized and a torque is applied to the starter drive.

12. A starter drive as described in claim 11 in which the member is connected to the driving unit and clutch by helical splines.

13. A starter drive as described in claim 12 in which the splines are oppositely directed relative to one another.

14. A starter drive as described in claim 1 in which the engaging speed is below the running speed of the engine so the starting motor is drivably connected to the engine only when the engine stops.

* * * * *